United States Patent
Peddanarappagari et al.

(10) Patent No.: US 7,212,742 B2
(45) Date of Patent: May 1, 2007

(54) POWER LEVEL MANAGEMENT IN OPTICAL NETWORKS

(75) Inventors: Kumar Vijay Peddanarappagari, Plano, TX (US); Jamil Omar-Hatem El-Reedy, Allen, TX (US); Emir Catovic, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 749 days.

(21) Appl. No.: 10/121,182

(22) Filed: Apr. 12, 2002

(65) Prior Publication Data

US 2004/0208511 A1 Oct. 21, 2004

(51) Int. Cl.
*H04B 10/08* (2006.01)

(52) U.S. Cl. .......................... 398/38; 398/17; 398/25; 398/94

(58) Field of Classification Search .................. 398/58, 398/82, 38, 48–51, 17
See application file for complete search history.

(56) References Cited

U.S. PATENT DOCUMENTS

| | | | | |
|---|---|---|---|---|
| 5,233,604 | A | 8/1993 | Ahmadi et al. | 370/60 |
| 5,317,566 | A | 5/1994 | Joshi | 370/60 |
| 6,031,647 | A | 2/2000 | Roberts | 359/161 |
| 6,067,572 | A | 5/2000 | Jensen et al. | 709/241 |
| 6,239,889 | B1 | 5/2001 | Harley et al. | 359/124 |
| 6,268,945 | B1 | 7/2001 | Roberts | 359/161 |
| 6,292,290 | B1 | 9/2001 | Wan et al. | 359/337 |
| 6,304,347 | B1 * | 10/2001 | Beine et al. | 398/38 |
| 6,314,092 | B1 | 11/2001 | Reeve | 370/351 |
| 6,314,093 | B1 | 11/2001 | Mann et al. | 370/351 |
| 6,654,561 | B1 * | 11/2003 | Terahara et al. | 398/26 |
| 6,671,256 | B1 * | 12/2003 | Xiong et al. | 370/230 |
| 6,674,557 | B1 * | 1/2004 | DaSilva et al. | 398/79 |
| 6,999,686 | B1 * | 2/2006 | Ryhorchuk | 398/162 |
| 2001/0021045 | A1 | 9/2001 | Tervonen et al. | 359/110 |
| 2002/0176131 | A1 * | 11/2002 | Walters et al. | 359/118 |
| 2002/0191250 | A1 * | 12/2002 | Graves et al. | 359/128 |
| 2004/0208512 | A1 * | 10/2004 | Peddanarappagari et al. | 398/25 |
| 2004/0208513 | A1 * | 10/2004 | Peddanarappagari et al. | 398/25 |

OTHER PUBLICATIONS

Peddanarappagari, et al., *Sharing of Power Level Information to Support Optical Communications*, patent application mailed to the U.S. Patent and Trademark Office on Apr. 12, 2002.

Peddanarappagari, et al., *Management of Optical Links Using Power Level Information*, patent application mailed to the U.S. Patent and Trademark Office on Apr. 12, 2002.

* cited by examiner

*Primary Examiner*—David C. Payne
(74) *Attorney, Agent, or Firm*—Baker Botts L.L.P.

(57) ABSTRACT

In an optical communication network, optical communication nodes exchange information detailing power level variations to support management and administration of optical communications. This exchange of information permits nodes to determine aggregate power level variations over light paths to support operations such as selection from available light paths and configuration of optical communication characteristics.

26 Claims, 4 Drawing Sheets

POWER LEVEL MANAGEMENT IN OPTICAL NETWORKS

TECHNICAL FIELD OF THE INVENTION

The present invention relates generally to optical communication networks and, more particularly, to power level management in optical networks.

BACKGROUND OF THE INVENTION

In typical synchronous optical network (SONET) systems, power level management is performed during the installation of a network, often manually, and then re-optimized with the addition or deletion of connections in the network. By measuring the channel power levels and optical signal-to-noise ratios at different points in the network, power levels at transmitters may be adjusted according to algorithms, improving the performance of the connections with smaller optical signal-to-noise at the cost of those connections with higher optical signal-to-noise. In addition, amplifiers often operate in an automatic level control (ALC) mode to minimize the impact of changes in span power losses. In this mode, changes in one channel's power level can influence another channel's power levels, thus complicating attempts to manage power levels. Because changes in particular power level parameters can affect the settings of other power levels, administrators often employ time consuming, iterative processes to achieve power level balancing.

SUMMARY OF THE INVENTION

In accordance with the present invention, techniques for power level management in optical networks are provided.

According to a particular embodiment, a method for power level management of optical communications receives a request to establish a communication channel with a remote optical node and determines a plurality of light paths to the remote optical node. For each of the light paths, the method determines a next node for the light path to the remote optical node, determines add power level variation for the light path, generates a path setup message identifying the light path and the add power variation, and communicates the path setup message to the next node.

According to a another embodiment, a method for power level management of optical communications receives a path setup message identifying a light path between an add node and a drop node, the path setup message comprising a power level variation value, and determines whether a channel for the light path to a next node in the light path is available. If the channel is available, the method determines through power level variation for the light path, adds the through power level variation to the power level variation value in the path setup message, and communicates the path setup message to the next node in the light path.

According to a another embodiment, a method for power level management of optical communications receives a plurality of path setup messages corresponding to a plurality of light paths from a remote optical node, each of the path setup messages identifying one of the light paths and indicating a power level variation value for the identified light path. For each of the path setup messages, the method determines drop power level variation for the light path identified in the path setup message, adds the drop power level variation to the power level variation value in the path setup message to obtain an aggregate power level variation for the identified light path, generates a setup reply message indicating the identified light path and the aggregate power level variation for the light path, and communicates the setup reply message to the remote optical node.

According to a another embodiment, a method for protection switching in an optical network detects failure of a light path, determines a protection light path, determines drop power level variation for the protection light path, generates a protection switch message identifying the protection light path and the drop power level variation, and communicates the protection switch message to a previous node on the protection light path.

Embodiments of the invention provide various technical advantages. Using these techniques, networks may implement power level management more quickly than compared to previous techniques. This speed of operation provides a number of advantages. For example, protection switching may require rapid response in the event of a severed link. With the disclosed techniques, power level management during protection switching, or even link restoration, can be implemented. Moreover, the potential speed of these techniques may also support emerging optical technologies, such as dynamically routed mesh networks.

In addition, these techniques can be implemented along with other and/or existing power level management techniques. For example, these techniques may be used to provide quick power level management, with other techniques, such as iterative power level adjustments, used for fine-tuning of power level adjustments.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
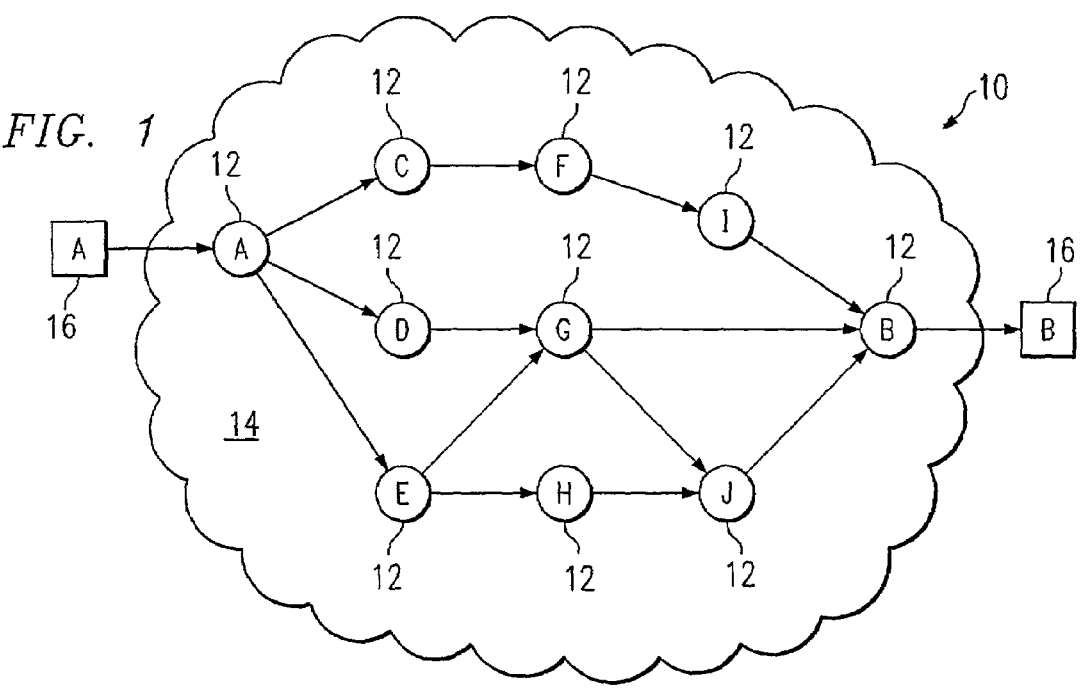
FIG. 1 illustrates an optical communication system having nodes that perform power level management in accordance with various embodiments of the present invention.

FIG. 1 illustrates an optical communication system, indicated generally at 10, that includes optical nodes 12 forming an optical network 14, which provides for the transportation of information between various elements such as communications devices 16. In general, nodes 12 communicate to determine aggregate power level variations on light paths to provide power level management for the light paths. More specifically, a selected node 12 (add node) attempting to establish a light path to another node 12 (drop node) may communicate with various nodes 12 to determine power level variations on one or more light paths from the add node to the drop node. The add node may use these light path power level variations to select and configure a light path to the drop node through network 14.

Network 14 represents any suitable collection and arrangement of elements providing for the communication of information in optical transmissions. This may include any appropriate electrical and optical interconnections to support the establishment of light paths for communication of information using circuit switched and/or packet based protocols. Each light path represents a communication channel spanning between two or more nodes 12. For example, according to particular embodiments, nodes 12 communicate information using wave-length division multiplexed (WDM) protocols. Thus, in certain embodiments, two adjacent nodes 12 may potentially be linked by multiple available light paths, such as a light path on each channel.

Nodes 12 represent hardware, including suitable controlling logic, supporting the communication of information in optical transmissions. For example, nodes 12 may provide add drop multiplexer (ADM) functionality to add, propagate, and drop optical signals transmitted on light paths. Each node 12 links using optical fibers to other nodes 12 in network 14 and potentially to other communications equipment, such as devices 16. In addition, each device 12 may link with other communications equipment, such as devices 12, using electrical communication channels to exchange management messages. For example, nodes 12 may exchange multi-protocol label switching (MPLS) messages using electrical communication channels. However, the system 10 contemplates nodes 12 using any suitable optical, electrical, or other communication links to support communication of management messages for the administration of optical communication links.

In the example illustrated, nodes 12 provide multiples routes (each potentially having multiple light paths) for optically transmitting information from a first device 16 (device A) to a second device 16 (device B). However, the example provided illustrates only selected elements and connections, and system 10 contemplates including any suitable elements providing connectivity between any number and type of communications equipment. Devices 16 represent any suitable equipment for the transmission and receipt of communications across optical network 14. For example, devices 16 may include gateways, switches, routers, and/or any other suitable communications equipment located within public or private networks.

In operation, nodes 12 provide power level management by exchanging power variation information to determine aggregate power level variations across light paths. To enable rapid calculation of power level variations for light paths, each node 12 maintains power level information indicating power level variations for each potential path (add, drop, and through) for node 12. For example, consider node 12 having sixty channels for optically transmitting information. Node 12 will maintain power level variations for adding, dropping, and passing through optical signals at a wavelength for each channel. Thus, for this example, node 12 maintains one hundred eighty values for power level variations (sixty for adding signals, sixty for dropping signals, and sixty for passing through signals). In addition, nodes 12 may maintain transmission power level variations measuring the variations in power caused by the transmission of optical signals across optical fibers. For example, each node 12 can measure and/or maintain information indicating the amount of power level variation resulting as optical signals propagate along optical fibers from adjacent nodes 12.

When establishing a link between an add mode and a drop node, nodes 12 communicate to determine aggregate power level variations along one or more light paths between the add node and the drop node. An aggregate power level variation indicates the sum of the add power level variation at the add node, the drop power level variation at the drop node, and through power level variations at each of the intermediate nodes in a light path. Based upon the aggregate power level variations, the add node selects a light path and configures to provide effective communications on the selected light path. For example, the add node may select the light path with an aggregate power level variation closest to a target and then set variable attenuation for the wavelength of the selected light path to a value appropriate to compensate for the determined aggregate power level variation.

For example, consider device 16 labeled A (device A) with information for communication to device 16 labeled B (device B). To communicate this information, network 14 may establish a link between node 12 labeled A (node A) and node 12 labeled B (node B). Thus, in this example, node A functions as an add node and node B functions as a drop node for transmissions. Node A, upon receiving an appropriate indication to establish a link with node B, such as a request from device A, initiates a process to determine power level variations along one or more light paths between node A and node B. To initiate the process, node A may first identify available light paths to adjacent nodes 12 on routes to node B. For example, node A may determine currently available channels to node C, node D, and node E. For each identified light path, node A determines the add power level variation, encodes this value into a path setup message, and communicates the setup message to the next node 12 on the light path.

For example, for each available wavelength between node A and node C, node A may determine the add power level variation for the wavelength, encode the value within a path setup message, and communicate the path setup message to node C. Node A may perform similar operations for available wavelengths to node D and node E. Thus, node A may communicate setup messages for multiple wavelengths to each of node C, node D, and node E. However, system 10 contemplates node A combining or separating the setup messages into one or more messages communicated to each of node C, node D, and node E. For example, node A may communicate a setup message for each available wavelength to Node C, with each setup message indicating the add power level variation within node A for the wavelength. Alternatively, node A may combine this information to reduce the number of setup messages communicated, such as by generating a single path setup message indicating each of the available wavelengths and, for each wavelength, the add power level variation within node A.

The path setup messages propagate along the paths between node A and node B, aggregating power level variations along the way. Along a light path, each intermediate node 12 supplements the encoded power level variation in a path setup message with a value for through power level variation. For example, node C receives one or more path setup messages from node A, with each message identifying a particular wavelength and specifying a power level variation (the specified power level variation at this point reflects only the add power level variation of node A at this wavelength). For each path setup message, node C determines whether the indicated wavelength is available to the next node 12 or nodes 12 in paths to node B. If so, node C determines through power level variations for the wavelength, adds this value to the power level variation encoded in the path setup message, and forwards the message to the next node or nodes 12. Therefore, as a setup message propagates through network 14, it accumulates power level variation information from each traversed node 12.

Node B thus receives one or more path setup messages identifying some or all potential light paths from node A through Network 14. For each message identifying a potential light path, node B determines drop power level variation for the identified wavelength and adds this value to the aggregate power level variation from the path setup message. This aggregate power level variation then reflects the total of the add, through, and drop power level variations affecting the light path. Node B replies to node A indicating the aggregate power level variations for each of the potential light paths. As with other management messages, nodes 12 may use separate messages for each reply or combine two or more replies into a single message. Regardless, these replies permit the originating node 12 (node A) to select between potential paths based on the aggregate power level variations for these paths.

Upon receiving the replies, node A may use any suitable techniques for selecting between potential paths. According to particular embodiments, node A selects the potential path having a power level variation closest to a target value. This target may be zero or a non-zero value. For example, power level variations for light paths may have a typical or average value for which nodes 12 can be designed to accommodate. The target value may reflect this "expected" power level variation. However, system 10 contemplates nodes 12 using any suitable algorithms, criteria, and techniques for selecting between potential light paths based upon aggregate power level variations.

Using the aggregate power level variation of the selected light path, node A can also adjust its operational characteristics. For example, Node A may adjust variable attenuation to accommodate the aggregate power level variation along the selected light path to provide an acceptable signal for receipt by node B. However, nodes 12 may have limited dynamic ranges that permit accommodation for only certain amounts of power level variation. If all of the potential light paths have an aggregate power level variation that exceeds the capabilities of this dynamic range, node A may indicate failure in establishing the link to node B.

According to particular embodiments, nodes 12 support protection switching using power level management techniques similar to those disclosed above. This leverages on the speed of these techniques to permit power level management in protection switching scenarios. In many optical systems, specifications dictate speeds at which protection switching must occur. For example, an optical system may require protection switching to occur in less than 50 milliseconds. According to particular embodiments, the disclosed techniques permit power level management and protection switching to occur in less than 50 milliseconds and potentially in less than 15 milliseconds. At these speeds, optical systems may even incorporate restoration in place of protection for severed links. In protection switching, a particular light path is selected as backup for an active link. If the active link fails, traffic is switched to the backup. In restoration, a new light path is selected from potential light paths on the failure of an active link. Thus, restoration potentially chooses a more effective link compared to protection.

To provide protection switching, nodes 12 monitor active light paths and, in the event of a failure, initiate switching of communications to a new light path. For example, consider a communications link between node A and node B along a light path routed over intermediate nodes D and G. Further assume a protection light path is assigned along the route of nodes C, F, and I. While the primary light path remains active, node B may monitor for failure. To monitor node B may use any suitable techniques to detect failure of the light path, such as by detecting the absence of light on the path.

Given a failure of the preliminary light path, node B initiates switchover to the backup light path. To effect the switch to the backup light path, node B generates a switchover message and communicates the message to node A along the route of the backup light path. Thus, the switchover message traverses nodes I, F, and C to reach node A. To generate the switchover message, node B determines drop power level variation for the wavelength of the backup light path and encodes this value within the switchover message. Then as the switchover message propagates to node A, each intermediate node 12 supplements the power level variation information with appropriate values. Thus, nodes I, F, and C each add values for through power level variation at the wavelength specified for the backup light path. Therefore, node A may calculate the aggregate power level variation for the backup light path with the addition of the add power level variation within node A to the power level variation indicated in the received switchover message. Using this information, node A may configure its operation to provide acceptable signals along the backup light path. For example, as discussed above, node A may configure variable attenuation to accommodate for the aggregate power level variation expected along the backup light path.

In addition or as an alternative to providing protection switching, nodes 12 may support restoration of communications links upon failure of a light path. For example, consider the previous description of a failure along a primary light path from node A to node B traversing a path through nodes D and G. Upon detecting a failure of the primary light path, node B may initiate a restoration process using messaging similar to that described above with respect to provisioning of a new light path. However, according to particular embodiments, the flow of restoration path messages propagates in reverse along available routes from node A to node B. For example, node B may determine all available light paths from node A and, for each available light path, generate a recovery path message that indicates drop power level variation within node B for the wavelength associated with the light path. As with previously discussed messages, each node 12 along the route of a light path supplements the included power level variation with appropriate values. Thus, node A may perform restoration by selecting among any number of potential light paths based on aggregate power level variations for the light paths.

While the preceding descriptions and examples focus on particular embodiments for provisioning, protection, and restoration of light paths, system 10 contemplates nodes 12 using any suitable techniques for aggregating power level variations along light paths to select between and/or configure for communication on a light path.

Figure 2:
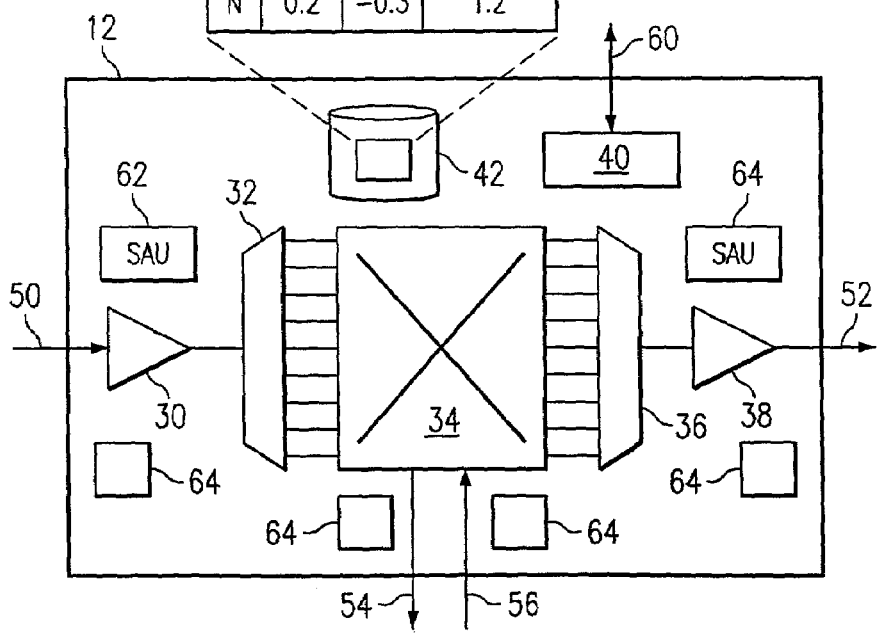
FIG. 2 illustrates a node from the optical communication system operable to perform power level management in accordance with various embodiments of the present invention.

FIG. 2 is a block diagram illustrating exemplary functional components of node 12, which includes a pre-amplifier 30, a de-multiplexer 32, an optical cross-connect fabric 34, a multiplexer 36 and a post-amplifier 38. In addition, node 12 includes a controller 40 and a memory 42 maintaining power level information that includes add data 44, through data 46, and drop data 48. Node 12 also includes spectrum analyzer units (SAUs) 62 and power monitors 64 for use in measuring power level variations along various channels and routes. In general, node 12 supports power level management of optical communications using power level information stored in add data 44, through data 46, and drop data 48. More specifically, node 12 exchanges information with other nodes 12 to permit selection, provisioning, and configuration of light paths based on aggregate power level variations calculated across light paths.

In the embodiment illustrated, node 12 provides a number of inputs and outputs. These include an input fiber 50 and an output fiber 52 that couple node 12 to other nodes 12 within network 14. Node 12 also includes drop fiber 54 and add fiber 56 that couple to other communications equipment, such as devices 16. In addition, node 12 includes a control line 60 for exchanging management messages with other communications equipment, such as other nodes 12 and devices 16. However, while control line 60 is illustrated as a distinct input/output line, management communications may take place between node 12 and other equipment through any appropriate inputs and outputs, such as an optical supervisory channel (OSC). Moreover, while input fiber 50 and output fiber 52 are described as coupling to other nodes 12 and drop fiber 54 and add fiber 56 are described as coupling to other communications equipment, system 10 contemplates node 12 coupling various optical inputs and outputs to any other appropriate optical communications equipment. For example, add fiber 56 may receive input generated and communicated along output fiber 52 of another node 12.

Pre-amplifier 30, de-multiplexer 32, optical cross-connect fabric 34, multiplexer 36, and post-amplifier 38 represent traditional components for supporting optical communications. Using input fiber 50, node 12 receives optical signals communicated on any number of different wavelengths. Each of these received signals may be passed through node 12 and retransmitted on output fiber 52 or "dropped" and transmitted on drop fiber 54. Node 12 may also receive one or more optical signals at various wavelengths using add fiber 56. Node 12 may introduce these signals into the traffic of network 14 by transmitting the signals on output fiber 52.

In the embodiment illustrated, the table within memory 42 that maintains add data 44, through data 46, and drop data 48 is expanded. This demonstrates a potential technique for maintaining power level variations for adding, dropping, and passing through optical signals at a number of different wavelengths. Add data 44 maintains power level variations for optical signals received on add fiber 56 and transmitted on output fiber 52. For each wavelength, this power level variation between signals received on add fiber 56 and signals transmitted on output fiber 52 represents the add power level variation. According to particular embodiments, add power level variation is defined as the power variation from the output of a transmitter coupled to add fiber 56 to the input of post-amplifier 38. The add power level variation may be measured for each of the wavelengths serviced by node 12. Thus, for example, if node 12 provides N wavelengths for the transmission of signals, node 12 may measure N add power level variations. Node 12 maintains values for each of these power level variations within add data 44.

To measure add power level variations, node 12 may communicate with neighboring communications equipment, such as other nodes 12 and/or devices 16. For example, node 12 may link to the output of device 16 using add fiber 56. Using an OSC, node 12 may exchange information with device 16 to determine the power level variation that occurs across add fiber 56. Node 12 sums this value with variations due to internal operations to determine an add power level variation. Thus, the add power level variation will reflect power level variation from the output of device 16 to the input of post-amplifier 38. To populate the table with add data 44, node 12 cycles through each channel, measuring the add power level variation and recording this value within add data 44. However, node 12 may determine each value at any appropriate time or times.

Similar to measurements for add power level variations, through power level variations and drop power level variations may be measured for other paths through node 12. Through data 46 reflects the measured power level variations at the various wavelengths serviced by node 12 between signals received on input fiber 50 and transmitted on output fiber 52. Likewise, drop data 48 maintains measured power level variations at each wavelength serviced by node 12 between signals received on input fiber 50 and transmitted on drop fiber 54. According to particular embodiments, through power level variation is defined as power variation measured along a particular channel between an output coupled to input fiber 50 and the input of post-amplifier 38. Similarly, drop power level variation is defined as the power level variation on a particular channel between the output of pre-amplifier 30 and the input of a receiver coupled to drop line 54.

To measure through and drop power level variations, node 12 uses techniques similar to those described above with respect to measurements of add power level variations. For example, using communications with neighboring network equipment, node 12 can develop the entries in the table that reflect add, drop, and through power level variations for each wavelength serviced by node 12. Therefore, add data 44, through data 46 and drop data 48 maintain power level variations for the different pathways for optical signals passing through node 12.

However, while specific definitions for add, through, and drop power level variations are described above, system 10 contemplates using any appropriate definitions for add, through, and drop power level variations based upon appropriately designated beginning and end points, so long as those definitions permit the aggregation of power level variations along light paths. Moreover, system 10 contemplates node 12 determining and/or updating power level information at any appropriate times using any suitable techniques. According to particular embodiments, node 12 uses spectrum analyzer units 62 and power monitors 64 to periodically, sporadically, and/or continuously monitor power level variations for adding, dropping, and passing through optical signals.

Controller 40 represents any suitable processor, controller, and/or suitable logic device for communicating power level information with other nodes 12 to enable power level management using aggregate power level variations along light paths. In the embodiment illustrated, controller 40 links to other communications equipment using control line 60. Through control line 60, controller 40 may exchange management messages, such as MPLS messages, with other communications equipment, such as other nodes 12. For example, through control line 60, controller 40 can exchange various messages with other nodes 12 to support the calculation of aggregate power level variations along light paths. However, as previously discussed, nodes 12 may use any suitable links to exchange management messages. For example, nodes 12 may use in-band signaling along communication channels, an optical supervisory channel (OSC), or any other appropriate link to exchange management messages.

In operation node 12 may function simultaneously as an add node, through node and/or drop node for one or more light paths. As an add node, node 12 may initiate path setup messages and use responses to select light paths and configure for operation. As a through node, node 12 responds to various messages, sharing through data 46 to aid in establishment of light paths. As a drop node, node 12 responds to path setup messages by sharing drop data 48 in responses. Moreover, as a drop node, node 12 may also monitor active light paths and manage protection and/or restoration in the event of failures. Thus, power level information stored in Memory 42 represents an important functional aspect of node 12, whether operating as an add node, through node, and/or drop node.

While the embodiments illustrated and the preceding description focus on a particular embodiment of node 12 that includes specific elements, system 10 contemplates node 12 having any suitable combination and arrangement of elements for sharing power variation information to enable power level management of light paths using aggregate power level variations. Thus, the modules and functionalities described may be combined, separated, or otherwise distributed among any suitable functional components, and some or all of the functionalities of node 12 may be performed by logic encoded in media, such as software and/or programmed logic devices.

Figure 3:
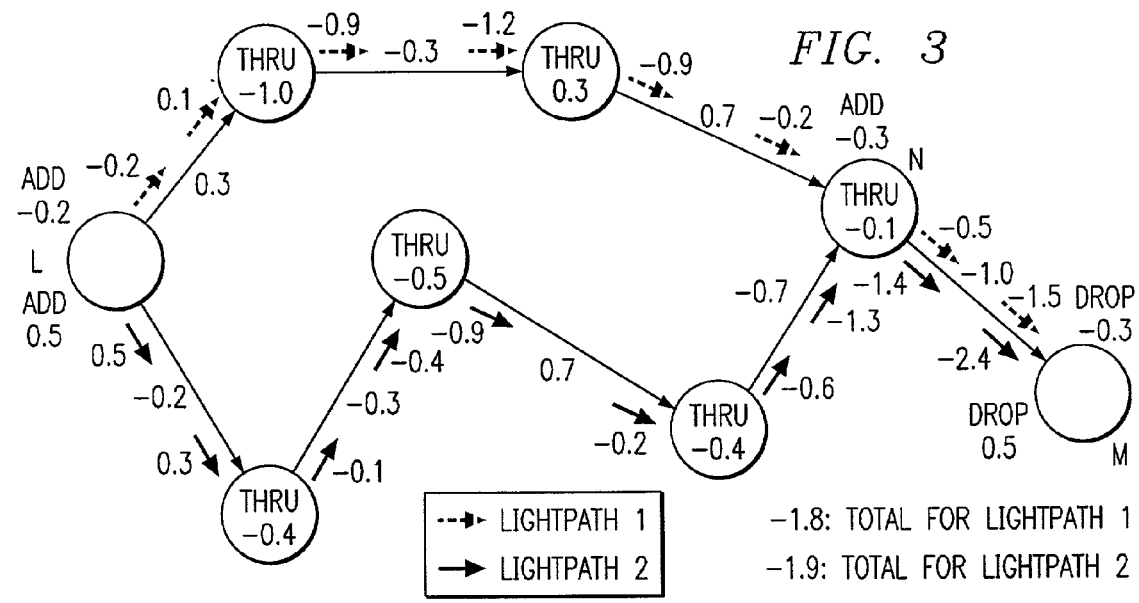
FIG. 3 illustrates a particular example of power level management in the optical communication system.

FIG. 3 is a diagram illustrating exemplary values for power level variations along two potential light paths from a first node 12 (node L) to a second node 12 (node M). Along each light path, exemplary values are given for add, through, and drop power level variations at each appropriate step. In addition, values for variations across connecting fiber segments are also provided (transmission power level variations). Thus, in this example, add, drop, and through values represent internal values that may be supplemented by the values for transmission power level variations. In the embodiment illustrated, light path 1 and light path 2 represent two potential light paths between node L and node M. Each of these light paths pass through a number of intermediate nodes 12, including node N, which is common to both light paths. At node N, light path 1 is routed through an add fiber, while light path 2 is routed through node N, thus, the values provided for power level variations along each light path reflect these routes.

To determine the aggregate power level variations for each light path, nodes 12 may use techniques such as those discussed above. For example, node L may communicate a path setup message along each of light path 1 and light path 2, with each message accumulating values for power level variations as it propagates along a light path. Thus, the aggregate power level variation for each light path will reflect add, through, drop, and transmission power level variations for appropriate nodes 12 and traversed fibers.

Using replies reporting these aggregate power level variations, node L may select and configure to provide suitable signals for reception by node M. For example, given the values provided in this illustration and assuming an algorithm that selects the smallest power level variation, node L will select light path 1. However, as previously discussed, system 10 contemplates nodes 12 using any suitable techniques for determining aggregate power level values and selecting between potential light paths based upon these values. Moreover, the example illustrated and accompanying description are provided only to clarify the operation of a particular embodiment.

Figure 4:
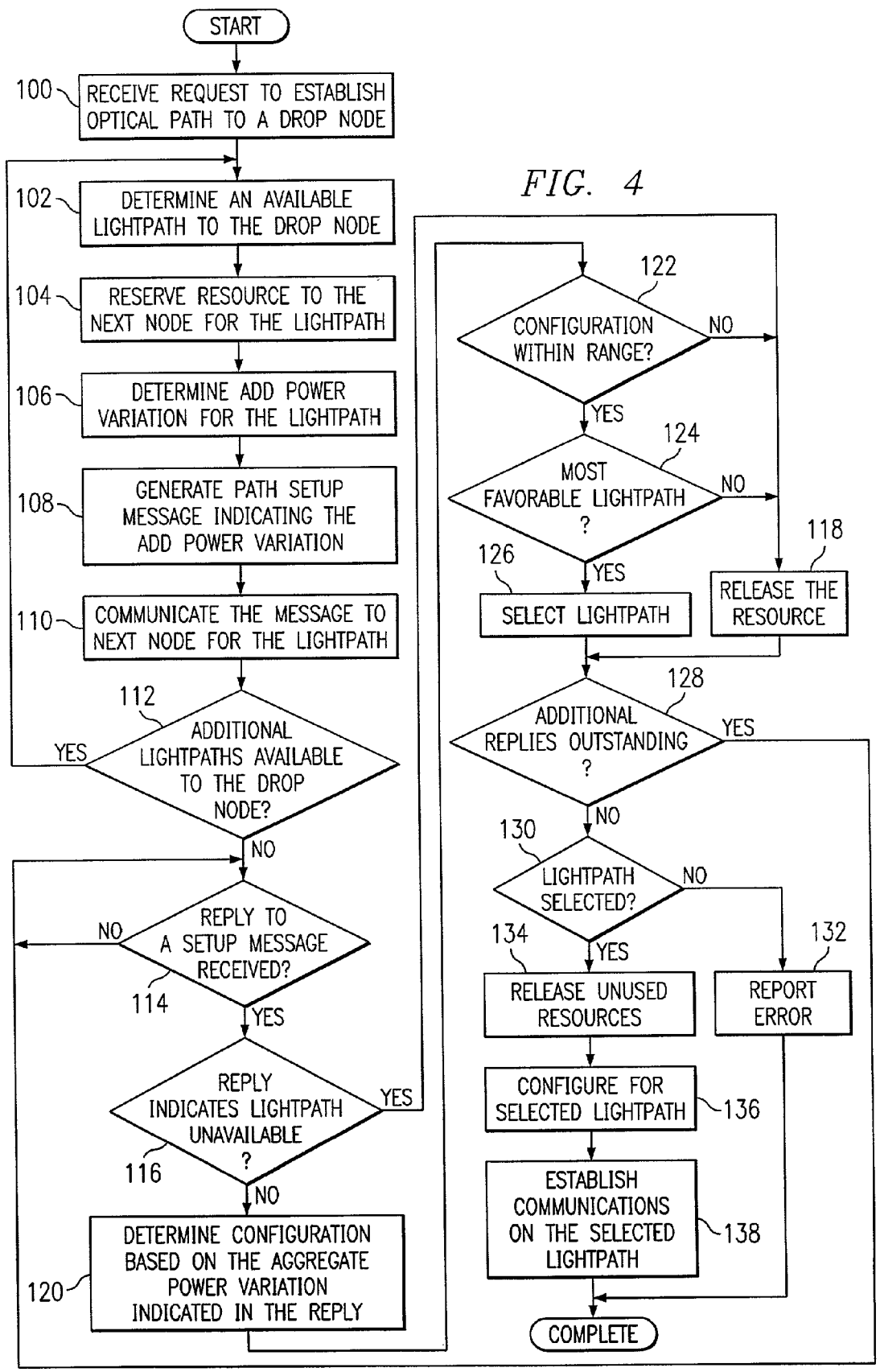
FIG. 4 is a flowchart illustrating a method for performing power level management at an add node for a light path.

FIG. 4 is a flowchart illustrating a method for node 12 to determine and use aggregate power level variations for potential light paths to a remote node 12. Node 12 receives a request to establish an optical path to a remote drop node 12 at step 100. Node 12 then, at steps 102 to 112, identifies potential light paths and initiates the determination of aggregate power level variations on these light paths. Node 12 determines an available light path to the drop node at step 102 and reserves the resource to the next node 12 for the light path at step 104. For example, node A may identify an available light path to node B that passes through node C and reserve the channel on the fiber segment from node A to node C. By reserving the resource, node A ensures that the potential channel will remain available until a decision is made whether or not to use the associated light path.

Node 12 determines the add power level variation for the light path at step 106. For example, node 12 may access add data 44 stored within memory 42 to determine the add power level variation for the channel associated with the light path. Node 12 then generates a path setup message indicating the determined add power level variation at step 108 and communicates the message to the next node 12 for the light path at step 110. For example, as previously discussed, node A may generate an MPLS message incorporating the add power level variation and communicate the message to node C.

Node 12 determines whether all available light paths to the drop node 12 have been identified at step 112. If not, node 12 continues to identify available light paths and generate path setup messages for these light paths. Thus, in the embodiment illustrated in this flowchart, node 12 can potentially identify all light paths available for establishing an optical communication link with drop node 12. However, system 10 contemplates node 12 using any suitable algorithms for limiting the light paths selected for consideration. For example, according to particular embodiments, nodes 12 each maintain information detailing topography of some or all of network 14 and use this information to identify potential routes between nodes 12.

At steps 114 to 128, node 12 receives and processes replies to path setup messages. Thus, node 12 determines whether a reply to a setup message has been received at step 114. If so, node 12 determines whether the reply indicates unavailability of the light path indicated in the path setup message. For example, while a particular channel may be available between node A and node C for a light path, node C may determine that a corresponding channel between node C and node F is unavailable. In response, node C may inform node A of the unavailability of the light path. In response to a reply indicating light path unavailability, node 12 releases the reserved resource at step 118. Thus, since the resource to the next node 12 will not be used for this communications link, node 12 can release the reservation so that the resource may be used for other links.

If the reply does not indicate unavailability of the light path, then the reply indicates an aggregate power level variation for the light path. Using the aggregate power level variation in the reply, node 12 determines an appropriate configuration. For example, node 12 may determine the power level and/or variable attenuation settings that accommodate for the indicated aggregate power level variation to provide suitable signals for reception by drop node 12. If the determined settings are not within the range of node 12, then node 12 will not use this light path. Thus, if the settings are out of range, node 12 will release the resource reserved for this light path at step 118. In addition, node 12 may inform intermediate nodes 12 to release any reserved resources for the light path.

However, if the settings are within range, node 12 determines whether the setting are the most favorable calculated at step 124. In this process, node 12 attempts to identify the most favorable light path based upon aggregate power level variations and/or determined configurations. As previously discussed, node 12 may use any suitable algorithms, target values, and/or calculations to determine whether one light path is more favorable than another. If the light path is not the most favorable, node 12 releases the resource at step 118 and, in addition, may inform intermediate nodes 12 to release corresponding resources. However, if the light path is the most favorable, node 12 selects the light path as the current selection at step 126. Node 12 continues this process until replies to all path setup messages have been received (or some other suitable event, such as a time out). Thus, node 12 determines whether additional replies remain outstanding at step 128 and, if so, continues monitoring for replies at step 114.

Upon receiving all appropriate replies, node 12 determines whether a light path has been selected at step 130. This determines whether one of the potential light paths identified was available and had an aggregate power level variation indicating settings within the range of node 12. If not, node 12 may report an error at step 132. For example, node 12 may generate an error message and communicate the message to the device that requested the optical communication link. However, if a light path has been selected, node 12 ensures that all unused resources are released at step 134 (including notifying intermediate nodes 12 to release unused resources). Node 12 configures for the selected light path at step 136. For example, node 12 may configure components to provide the power levels and/or variable attenuations determined for the selected light path. Node 12 then establishes communications on the selected light path at step 138.

The preceding flowchart illustrates only an exemplary method of operation, and system 10 contemplates nodes 12 using any suitable techniques and elements for identifying potential light paths and using power level variation information received from other nodes 12 to select a light path for communication. Thus, many of the steps in this flowchart may take place simultaneously and/or in different orders than as shown. In addition, node 12 may use methods with additional steps, fewer steps, and/or different steps, so long as the methods remain appropriate.

Figure 5:
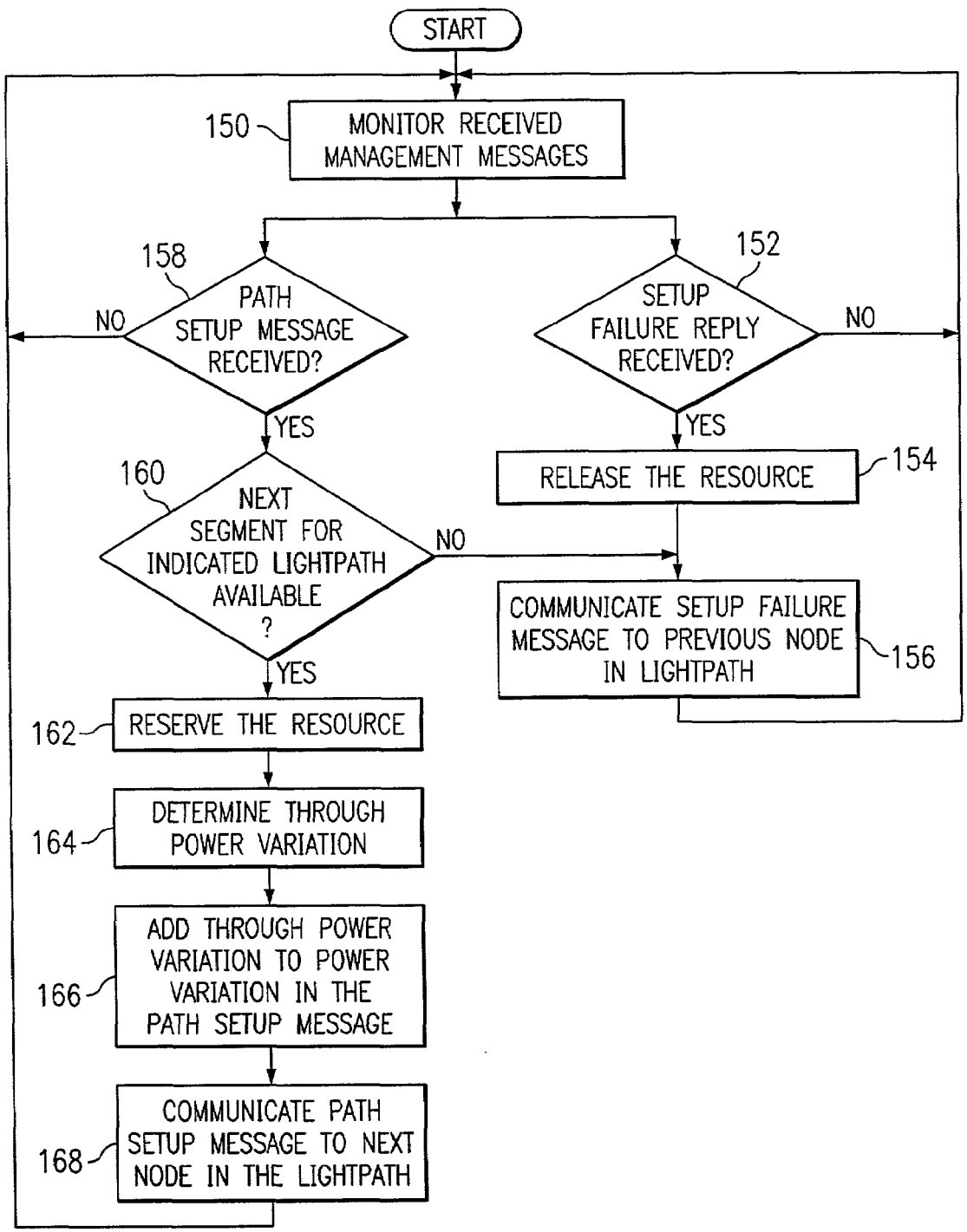
FIG. 5 is a flowchart illustrating a method for performing power level management at an intermediate node of a light path.

FIG. 5 is a flowchart illustrating a method for node 12 to share power level information with other nodes 12. Thus, this flowchart details the operation of node 12 as a potential intermediate node of a light path. Node 12 monitors received management messages at step 150. For example, node 12 may monitor MPLS messages received from other nodes 12 using control line 60. In this flowchart, the method provides processing for path setup messages and replies indicating failure to establish a light path. Node 12 determines whether a setup failure reply has been received at step 152. Node 12 may receive this reply in a variety of scenarios. For example, node C may, after receiving a path setup message from node A, communicate a similar path setup message to node F. If node F determines that no corresponding channel is available between node F and node I, node F may communicate a setup failure message to node C. Node C may also receive setup failure messages from node A. For example, upon determining not to use a particular light path through node C, node A may inform node C of the failure.

In response to receiving a setup failure reply, node 12 releases any reserved resources at step 154. In addition, node 12 communicates the setup failure message to the previous node 12 in the light path at step 156. (Or communicates the setup failure message to the next node 12 in the light path as appropriate.) This permits all nodes 12 to release reserved resources when appropriate.

In response to detecting a path setup message at step 158, node 12 determines whether the next segment for the indicated light path is available at step 160. For example, upon receiving a path setup message from node A indicating a particular channel, node C may determine whether a corresponding channel is available on the fiber between node C and node F. If node 12 determines that the next segment for the indicated light path is unavailable, node 12 communicates a setup failure message to the previous node in the light path at step 156. However, if the segment is available, node 12 reserves the resource at step 162.

Node 12 also determines through power level variation for the channel indicated in the path setup message at step 164. For example, node 12 may access through data 46 maintained in memory 42 to determine the value indicated for the particular channel. Node 12 adds this value to the power level variation indicated in the path setup message at step 166. Therefore, the value indicated in the path setup message will reflect the aggregate power level variation up to and through the current node 12. Node 12 communicates the path setup message to the next node 12 in the light path at step 168. This technique permits distribution of processing and data maintenance that provides scalability while retaining network level power level management.

However, as with the earlier described flowchart, the preceding flowchart illustrates only an exemplary method of operation. Thus, many of the steps in this flowchart may take place simultaneously and/or in different orders than as shown. In addition, node 12 may use methods with additional steps, fewer step, and/or different steps, so long as the methods remain appropriate.

Figure 6:
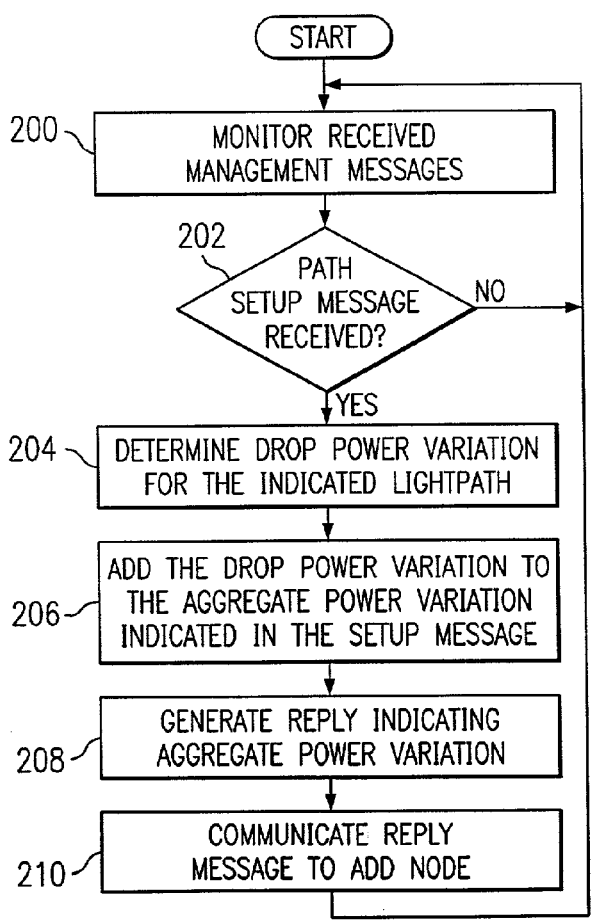
FIG. 6 is a flowchart illustrating a method for performing power level management at a drop node of a light path.

FIG. 6 is a flowchart illustrating a method for node 12 to determine and share power level variations for power level management of light paths across network 14. This flowchart focuses in particular upon the operation of node 12 as a drop node for a communication path. Node 12 monitors received management messages at step 200 to determine whether a path setup message has been received at step 202. Upon receiving a path setup message indicating node 12 as a drop node, node 12 determines drop power level variation for the indicated light path at step 204. For example, node 12 may access drop data 48 maintained in memory 42 to determine a value for drop power level variation on the channel identified within the path setup message. Node 12 adds the drop power level variation to the aggregate power variation value indicated in the path setup message at step 206. Thus, at this point, node 12 has determined the aggregate power level variation for the entire light path from the originating add node 12 to drop node 12. Node 12 generates a reply indicating this aggregate power level variation at step 208 and communicates the reply message to add node 12 at step 210.

However, as with the earlier described flowcharts, the preceding flowchart illustrates only an exemplary method of operation. Thus, many of the steps in this flowchart may take place simultaneously and/or in different orders than as shown. In addition, node 12 may use methods with additional steps, fewer step, and/or different steps, so long as the methods remain appropriate.

Figure 7:
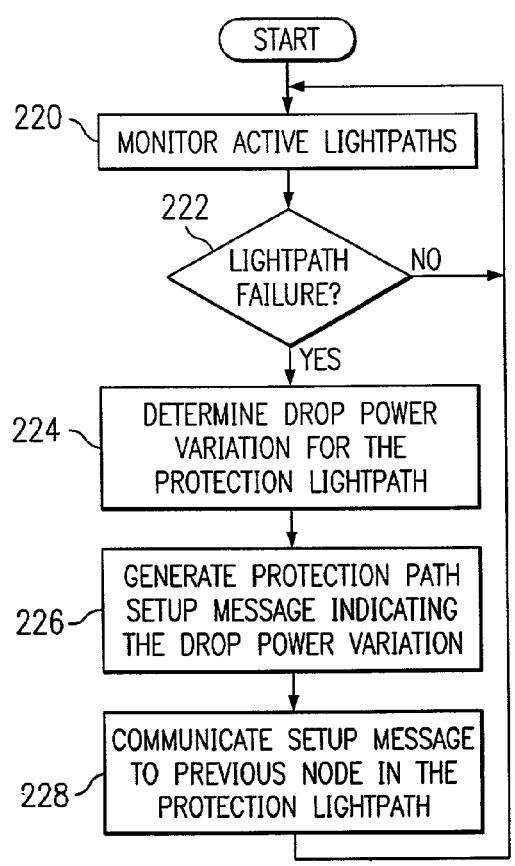
FIG. 7 is a flowchart illustrating a method for performing power level management during protection switching.

FIG. 7 is a flowchart illustrating the operation of node 12 in monitoring for and responding to failure of a light path. The chart focuses in particular upon the operation of node 12 operating as a drop node. Node 12 monitors active light paths at step 220. For example, as previously discussed, node 12 may monitor for the continuous receipt of light along each light path currently in use. Upon detecting a failure of a light path at step 222, node 12 initiates messaging to reestablish the communication link while further providing power level management for the backup/protection light path.

In the embodiment illustrated by this flowchart, node 12 attempts to reestablish the communication link using a dedicated protection light path. Node 12 determines a drop power level variation for the protection light path at step 224. Node 12 generates a protection path setup message indicating the determined drop power level variation at step 226 and communicates the setup message to the previous node 12 in the protection light path at step 228. As previously discussed, this message then propagates in reverse along the light path accumulating power level variations along the way. Thus, this message eventually provides notice to the originating add node 12 of the failure while further providing information suitable for reestablishing the communication link on the protection light path with appropriate configurations.

The preceding flowcharts and accompanying description illustrate only exemplary methods of operation, and system 10 contemplates nodes 12 using any suitable techniques and elements for operating as add nodes, drop nodes and through nodes. Thus, many of the steps in these flowcharts may take place simultaneously and/or in different orders than as shown. For example, since each node 12 may simultaneously operate as an add node, drop node, and/or through node, a single node 12 may simultaneously perform many of the techniques illustrated by these flowcharts. In addition, nodes 12 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for power level management of optical communications, the method comprising:
   receiving a request to establish a communication channel with a remote optical node;
   determining a plurality of light paths to the remote optical node;
   for each of the light paths:
      determining a next node for the light path to the remote optical node;
      determining add power level variation for the light path;
      generating a path setup message identifying the light path and the add power variation; and
      communicating the path setup message to the next node;
   receiving at least two path setup replies from the remote optical node, each of the path setup replies indicating an aggregate power level variation for a corresponding one of the light paths; and
   selecting one of the light paths based on the aggregate power level variations indicated in the path setup replies.

2. The method of claim 1, further comprising configuring optical communication equipment based on the aggregate power level variation for the selected light path.

3. The method of claim 1, further comprising configuring variable attenuation for the selected light path to accommodate for the aggregate power level variation for the selected light path.

4. The method of claim 1, wherein selecting comprises choosing one of the light paths with the aggregate power level variation closest to a target value.

5. The method of claim 1, further comprising, for each of the light paths, reserving a resource to the next node for the light path.

6. The method of claim 5, further comprising:
   receiving a path setup failure message for an identified one of the light paths; and
   in response to the path setup failure message, releasing the resource reserved for the identified light path.

7. The method of claim 5, further comprising:
   receiving a plurality of path setup replies from the remote optical node, each of the path setup replies indicating an aggregate power level variation for a corresponding one of the light paths;
   selecting one of the light paths based on the aggregate power level variations indicated in the path setup replies; and
   releasing the reserved resources for all of the light paths other than the selected light path.

8. The method of claim 1, further comprising maintaining add data indicating an add power level variation for each of a plurality of channels.

9. An optical communication node comprising:
   a cross-connect fabric operable to receive optical communications from an input fiber and an add fiber and to switch received optical communications for transmission on a selected one of an output fiber and a drop fiber; and
   a controller operable to receive a request to establish a communication channel with a remote optical node and to determine a plurality of light paths to the remote optical node, the controller further operable, for each of the light paths, to determine a next node for the light path to the remote optical node, to determine add power level variation for the light path, to generate a path setup message identifying the light path and the add power variation, and to communicate the path setup message to the next node, the controller further operable to receive at least two path setup replies from the remote optical node, each of the path setup replies indicating an aggregate power level variation for a corresponding one of the light paths, and select one of the light paths based on the aggregate power level variations indicated in the path setup replies.

10. The node of claim 9, further comprising:
    a first optical amplifier coupled to the cross-connect fabric and operable to receive optical communications from the input fiber; and
    a second optical amplifier coupled to the cross-connect fabric and operable to transmit optical communications on the output fiber.

11. The node of claim 10, further comprising a memory maintaining add data indicating an add power level variation for each of a plurality of channels.

12. The node of claim 11, wherein the add power level variation for a channel indicates variation in power between an output of a device coupled to the add fiber and the second optical amplifier at a wavelength of the channel.

13. The node of claim 9, wherein the controller is further operable to configure variable attenuation for the selected light path to accommodate for the aggregate power level variation for the selected light path.

14. The node of claim 9, wherein the controller is further operable to select by choosing one of the light paths with the aggregate power level variation closest to a target value.

15. The node of claim 9, wherein the controller is further operable, for each of the light paths, to reserve a resource to the next node for the light path.

16. The node of claim 15, wherein the controller is further operable to:
receive a path setup failure message for an identified one of the light paths; and
in response to the path setup failure message, release the resource reserved for the identified light path.

17. The node of claim 15, wherein the controller is further operable to:
receive a plurality of path setup replies from the remote optical node, each of the path setup replies indicating an aggregate power level variation for a corresponding one of the light paths;
select one of the light paths based on the aggregate power level variations indicated in the path setup replies; and
release the reserved resources for all of the light paths other than the selected light path.

18. Computer logic for power level management of optical communications, the computer logic encoded in a computer readable medium and operable when executed to:
receive a request to establish a communication channel with a remote optical node;
determine a plurality of light paths to the remote optical node;
for each of the light paths:
determine a next node for the light path to the remote optical node; determine add power level variation for the light path;
generate a path setup message identifying the light path and the add power variation; and
communicate the path setup message to the next node;
receive at least two path setup replies from the remote optical node, each of the path setup replies indicating an aggregate power level variation for a corresponding one of the light paths; and
select one of the light paths based on the aggregate power level variations indicated in the path setup replies.

19. The logic of claim 18, further operable to configure optical communication equipment based on the aggregate power level variation for the selected light path.

20. The logic of claim 18, further operable to configure variable attenuation for the selected light path to accommodate for the aggregate power level variation for the selected light path.

21. The logic of claim 18, further operable to select by choosing one of the light paths with the aggregate power level variation closest to a target value.

22. The logic of claim 18, further operable, for each of the light paths, to reserve a resource to the next node for the light path.

23. The logic of claim 22, further operable to:
receive a path setup failure message for an identified one of the light paths; and
in response to the path setup failure message, release the resource reserved for the identified light path.

24. The logic of claim 22, further operable to:
receive a plurality of path setup replies from the remote optical node, each of the path setup replies indicating an aggregate power level variation for a corresponding one of the light paths;
select one of the light paths based on the aggregate power level variations indicated in the path setup replies; and
release the reserved resources for all of the light paths other than the selected light path.

25. The logic of claim 18, further operable to maintain add data indicating an add power level variation for each of a plurality of channels.

26. An optical communication node comprising:
means for receiving a request to establish a communication channel with a remote optical node;
means for determining a plurality of light paths to the remote optical node;
means for, for each of the light paths:
determining a next node for the light path to the remote optical node;
determining add power level variation for the light path;
generating a path setup message identifying the light path and the add power variation; and
communicating the path setup message to the next node;
means for receiving at least two path setup replies from the remote optical node, each of the path setup replies indicating an aggregate power level variation for a corresponding one of the light paths; and
means for selecting one of the light paths based on the aggregate power level variations indicated in the path setup replies.

* * * * *